Jan. 12, 1965 G. L. CLAPPER 3,165,644

ELECTRONIC CIRCUIT FOR SIMULATING BRAIN NEURON CHARACTERISTICS INCLUDING MEMORY MEANS PRODUCING A SELF-SUSTAINING OUTPUT

Filed Dec. 26, 1961 2 Sheets-Sheet 1

INVENTOR
GENUNG L. CLAPPER

BY William [signature]
ATTORNEY

United States Patent Office 3,165,644
Patented Jan. 12, 1965

3,165,644

ELECTRONIC CIRCUIT FOR SIMULATING BRAIN NEURON CHARACTERISTICS INCLUDING MEMORY MEANS PRODUCING A SELF-SUSTAINING OUTPUT

Genung L. Clapper, Vestal, N.Y., assignor to International Business Machines Corporation, New York, N.Y., a corporation of New York Filed Dec. 26, 1961, Ser. No. 162,127
2 Claims. (Cl. 307—88.5)

The present invention relates to an adaptive logic device and in particular to a device which simulates a physiological neuron.

A neuron is that element of the brain which is the memory cell for intelligence. While the organization of neurons contained in the brain and their method of storing intelligence is not at present understood, some of their characteristics are known.

The present invention has an object—the simulation of the neuron of the brain by electronic circuitry. By usage of such a circuitry in experiments in the laboratory and study of the results, insight into how the brain functions and how electronic circuitry may be developed to implement the same may be developed. Thus the primary object of the present invention is to provide apparatus which simulates most of the known characteristics of the neuron cells contained in the brain.

These characteristics are as follows:

(1) Excitation by multiple inputs nonselectively
(2) Inhibition over-rides inputs
(3) Adaptive threshold changes with neuron usage
(4) Refractory period—insensitive after firing
(5) Summation—inputs integrate
(6) Output frequency—the function of inputs and usage
(7) Unit may function in a closed loop
(8) Output is binary (all or none)
(9) An ability to learn from experiences built in.

While the principal usage of the present invention may at present be in the laboratory as a teaching tool in the study of brain cell activity, it is, at present, also useful in transmission network where bilateral characteristics are desirable.

It is therefore an object of the present invention to provide apparatus which simulates a neuron.

A further object of the present invention is to provide apparatus which generates an output when a given threshold is reached and which contains inhibit means for preventing an output for a predetermined time after the output is generated.

Another and further object of the present invention is to provide apparatus responsive to an input of a given magnitude for generating an output of predetermined frequency in which an input over a given value will be stored and added to the input to increase the output frequency.

Still a further object of the present invention is to provide a device having bilateral transmission characteristics.

Another and further object of the present invention is to provide apparatus which may be set by conditioning the input and output and will remain in this condition until input conditions are reduced below a predetermined minimum.

The foregoing and other objects, features and advantages of the invention will be apparent from the following more particular description of a preferred embodiment of the invention, as illustrated in the accompanying drawings.

Figure 1:
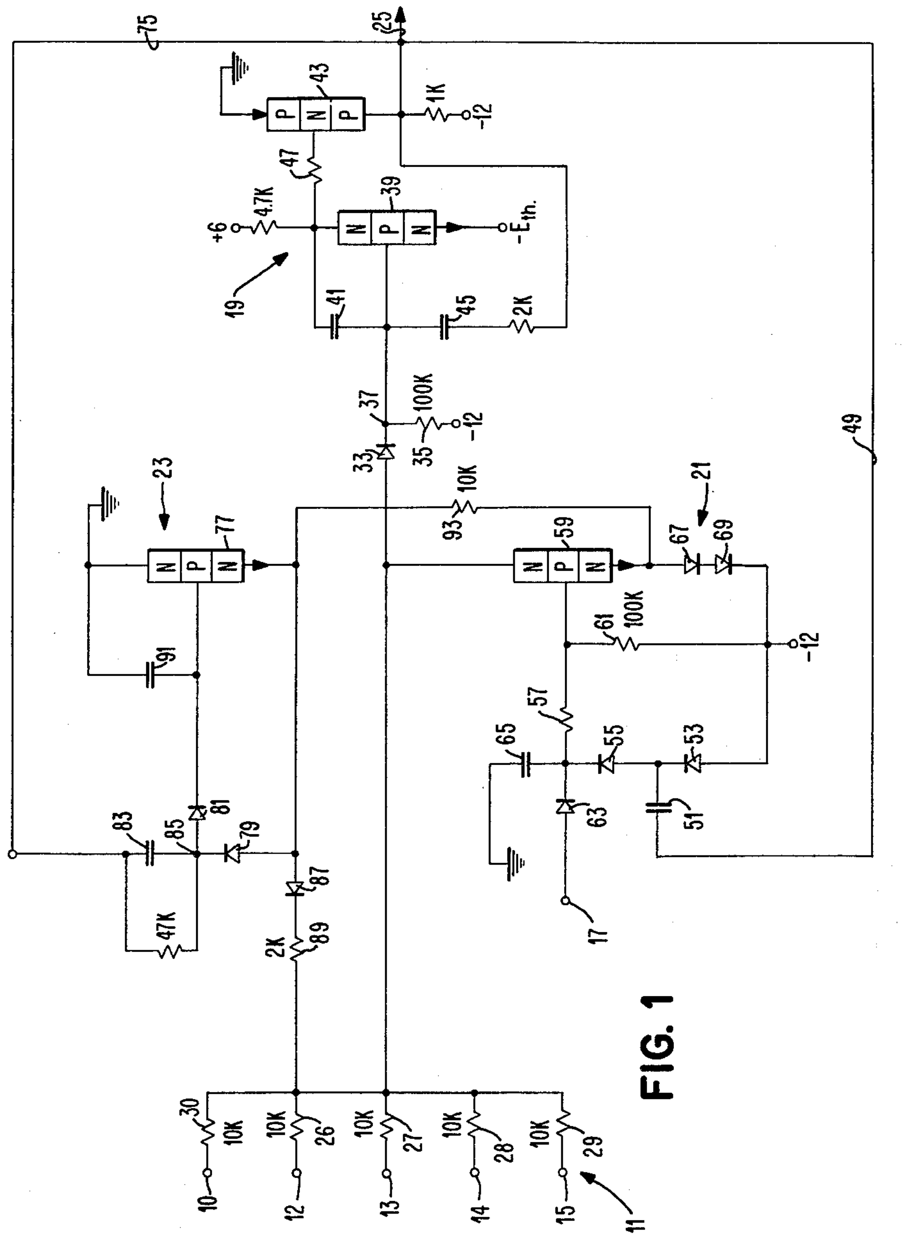
FIG. 1 is a circuit diagram of the electronic neuron of the present invention.

The input 11 of the neuron unit, FIG. 1, consists of a series of input terminals 10, 12, 13, 14, and 15 to which inputs are applied. For the present these inputs shall be considered as D.C. Also in the present example an input is considered to be present when the voltage at any terminal rises to ground potential. When there is no input, the voltage thereon will drop to −12 volts. It should be understood here, as in all other instances where resistances, voltages and other elements are described particularly, that they may be varied to suit the requirement as to signal levels, time constants, etc.

The network 11 formed by resistances 26–30 sums the input voltage signals across a resistor 35 which applies the sum voltage to the base of a transistor 39. The transistor has applied to its emitter a voltage $-E_{th}$. When the sum of the voltages at input 11 is greater than $-E_{th}$, the transistor 39 will conduct. This voltage $-E_{th}$ could for example be −6 volts where the inputs are D.C. signals. In this general situation, approximately 2½ inputs are required to initiate conduction in transistor 39, practically this would necessarily be three inputs, if all are D.C. For pulse inputs, a value such as −8 volts might be desirable, as will be explained subsequently.

The circuit 19 is an integrating pulse shaper and operates to accept signals in pulse or D.C. form; integrate the same; and generate a sharply rising and falling output pulse.

When the transistor 39 is biased to conduction by the applied signal at its base, the collector will drop in voltage to $-E_{th}$. A transistor 43 is normally biased to nonconduction by the 6 volt collector voltage of transistor 39. When the voltage on the collector of transistor 39 drops, the transistor 43 will be biased to conduction, and the collector voltage of transistor 43 will rise to ground potential to generate a positive-going output pulse.

The output pulse at the collector of transistor 43 will be reflected across a capacitor 45 to reinforce the bias already applied to the base of transistor 39.

The positive-going output pulse at 25 is applied through a loop 49 to an inhibit circuit 21. This pulse is applied across capacitor 51 through a diode 55 and across a resistor 57 to the base of a transistor 59. A capacitor 65 is charged and will retain the charge after the output 25 drops. The positive voltage applied to this normally nonconducting transistor causes the same to conduct and drop the collector voltage. The collector of transistor 59 is tied to the input circuit and thus drops the input voltage to −12 volts and isolates the intergrating pulse shaper 19 by back-biasing diode 33. An inhibit input 17 is provided when desired to activate inhibit circuit 21 to reset the entire adaptive logic unit, FIG. 1.

The voltage biasing transistor 39 to conduction is thus allowed to decay across resistor 35 to the −12 volt supply. As the voltage at the base of transistor 39 drops below $-E_{th}$ volts, the transistor current is cut off, and the collector rises toward +6 volts. As the collector voltage of transistor 39 rises to ground potential or above, the transistor 43 connected thereto is cut off, and the collector of the same drops toward −12 volts and applies this negative-going excursion across capacitor 45 to drive transistor 39 sharply into cutoff. Thus the pulse shaper 19 develops an output pulse having a sharp rise and fall.

In the inhibit circuit 21, the pulse applied to transistor 59 then decays through resistor 61 until the voltage at the bias voltage is insufficient for conduction and the transistor cuts off. The time for the discharge of capacitor 65 is greater than the time constant used for transistor 39, although this can be varied to suit the circumstances. It is however desirable to have the inhibit circuit 21 exercise control over the pulse generator 19, and thus the time constants have been chosen accordingly.

As the inhibit circuit 21 cuts off, inputs at 11 will reestablish the voltage at point 37 by charging the capacitor 41 until conduction is resumed in transistor 39, and the cycle is repeated.

As an illustration of the operation of this portion of the circuit and with 3 D.C. inputs applied, the output pulse will be of approximately 2 ms. duration, while the time period between pulses, during which the voltage at point 37 is approaching the conduction potential of transistor 39, will be approximately 15 ms. The time period that transistor 59 is conducting is known as the refractory period and is that period of time in which no outputs will be generated regardless of the inputs applied. This is about 2 ms. for the present example.

Also connected to the output 25 of pulse generator 19 is a memory circuit 23. As the pulse on output 25 rises from −12 volts to ground, the 12-volt excursion will be reflected across capacitor 83 through diode 81 to charge the capacitor 91. The capacitors 83 and 91 are so proportioned that a single pulse from output 25 will charge the capacitor 91 approximately ¼ volt. The ¼ volt bias on the base of a transistor 77 will initiate conduction in the same. When the transistor 77 conducts, the capacitor 91 will discharge through the base emitter connection, resistor 93, diodes 67 and 69 to the −12 volt supply. The effective time constant for the capacitor 91, resistor 93 combination is approximately six times as long as the time constant for the pulse generator 19. During this period, therefore, the charge on capacitor 91 caused by a single pulse of output 25 will have time to leak off and allow the transistor to resume a nonconducting status.

As the circuit has been implemented, the memory 23 contributes approximately the same weight in input signals that all other inputs together contribute. This, of course, may be varied to suit the circumstances.

In this particular instance where it has been assumed that three inputs have a signal applied thereto, the memory will have substantially no effect on the circuit. This is based on the following considerations. With three inputs present, the signal off period will be approximately 15 ms., and the transistor 77 drops rapidly from full conduction to nonconduction as the charge on capacitor leaks off. Based on the time constants, the transistor 77 will be completely nonconducting after approximately 12 ms.

If, however, the number of inputs is increased to four, the sum of input voltages will tend to rise at a higher rate, and the signal off period will decrease to approximately 10 ms. without memory. In this case, the memory output will be effective during its short time and aid in decreasing the signal off period by adding its input during this period. Thus when four inputs are applied, the memory unit 23 will be effective to increase the frequency to a higher value over a period of time.

This results from the fact that the output 25 will increase in frequency and apply charge to the capacitor 91 to build the charge to higher values over a period of time. If it is assumed that during the first 10 ms. signal off period, the ¼ volt charge on capacitor 91 discharges to a voltage of approximately .1 volt, the next pulse from output 25 will raise the charge to .35 volts. As more pulses are generated, the voltage on capacitor increases as a result of these additive charges. Further, of course, the input voltage applied through diode 87, resistor 89 becomes more effective for longer periods and thus increases the frequency of generator 19 which further charges the capacitor 91 at a faster rate.

The charging arrangement for capacitor 91 may be found described in detail in U.S. patent application, Serial No. 76,263 to Genung L. Clapper.

When the number of inputs are increased to five, the signal off period is decreased to approximately 5 ms. without the memory unit, and the memory will be effective to increase the output 25 to its maximum frequency.

At this point, all save one input may be removed, and the unit of FIG. 1 will continue to generate output pulses. This output will be self-sustaining, and the frequency will be somewhere equivalent to three inputs or four inputs. If the last input is discontinued, the output 25 will cease.

While the apparatus of FIG. 1 has been described using D.C. inputs to simplify the explanation, it should be understood that pulse inputs are contemplated as equally if not more desirable. This is particularly important since the inputs to the circuit of FIG. 1 will be later described as being of the same time as that generated by the output 25.

As mentioned previously, the pulse generator 19 is an integrating pulse shaper, and the input pulses will be integrated by the capacitor 41 in combination with transistor 39. In determining the effect of pulses applied to each input wherein the excursion is −12 volts to ground, it is only necessary to consider the duty cycle of the input pulses. Thus for a pulse having a 50% duty cycle, the effect will be 50% of the D.C. signal having a magnitude of zero volts. For signals having a lesser frequency, the same criteria may be applied.

In this connection, the voltage $-E_{th}$ applied to the emitter of transistor 39 should be lowered somewhat. For example, −8 volts might be dseirable where the inputs applied at 11 are received from outputs 25 from similar devices. This is based on the fact that the frequencies of the inputs of these devices have been arbitrarily chosen in the present example to run from 50 cycles to 240 cycles per second with a duty cycle of 2 ms. for the output pulse.

The details of the integrating pulse shaper 19 are described and claimed in application Serial No. 161,181 to Genung L. Clapper, now Patent 3,098,939.

Representative values for some of the capacitors shown in FIG. 1 are:

| Capacitor: | Mfd. |
|---|---|
| 41 | 0.033 |
| 34 | 0.1 |
| 51 | 0.1 |
| 65 | 0.15 |
| 83 | 0.1 |
| 91 | 5.0 |

Figure 2:
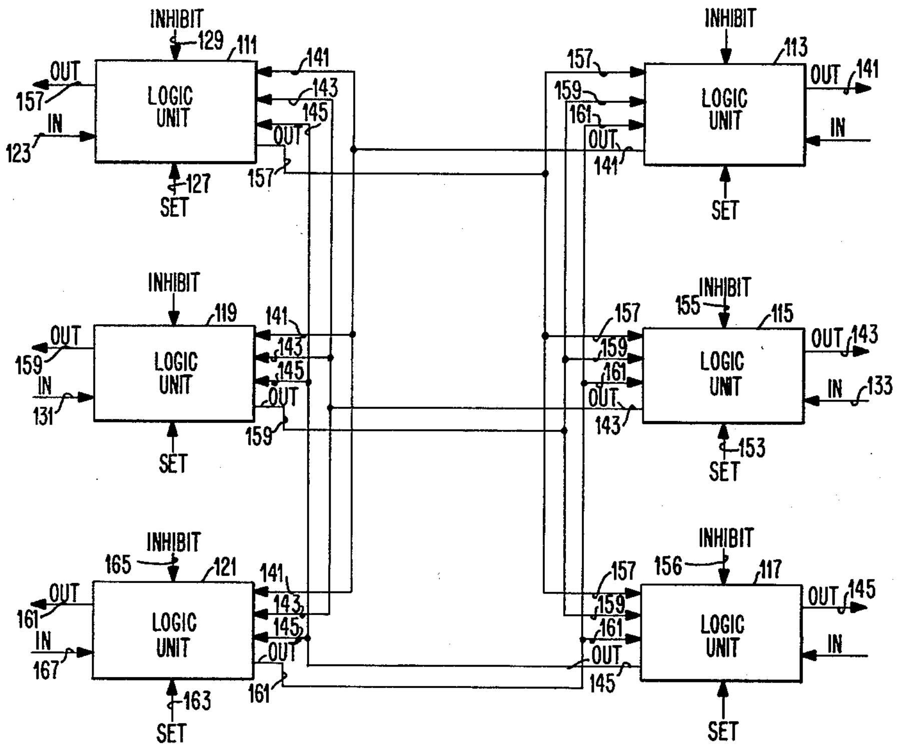
FIG. 2 is a system of electronic neurons.

In FIG. 2, a plurality of neurons as shown in FIG. 1 have been arranged in a transmission circuit.

For this example consider neuron 111 which will have all the characteristics of the others shown. Five inputs, 123, 127, 141, 143, and 145, are shown, and these correspond generally to the input at 11, FIG. 1. The word generally is used advisedly since this number is not fixed. Further the input 127, labeled "set," must be of a magnitude in combination with an additional input 123, 141, 143 or 145 sufficient to activate the memory, such as 23 of FIG. 1, so that the neuron 111 will generate output pulses at 125 on a self-sustaining basis and allow the set input to be removed. It should be noted that an output 157 is shown at both sides of the neuron for convenience. An inhibit line 129 is shown for terminating operation of the neuron.

As the neuron network is arranged, each output from each neuron is connected as an input to three other neurons. For example, the neuron 111 has its output 157 connected as an input to the neurons 113, 115, and 117. Neuron 119 has an output 159 connected as an input to neurons 113, 115, and 117. Neuron 121 has an output 161 connected as an input to neurons 113, 115, and 117. The neurons 113, 115, and 117 have outputs 141, 143, and 145 which form the inputs of neurons 111, 119, and 121 in a similar manner.

In operation, if the neuron 117 is always conditioned by raising the voltage at input 123 and set input 127, the neuron 111 will generate a self-sustaining series of output pulses on output 157 so long as these inputs are held up. If the neuron 115 is similarly conditioned by raising inputs 133 and 153, the neurons 111 and 115 will exchange pulse outputs. Thus the output 157 of neuron 111 is connected as an input to neuron 115 while the output 143 of neuron is an input to neuron 111. Thus once the neurons have been conditioned to generate a self-sustaining output with only one input, as by set 127 and input 123 of neuron 111, two neurons each activated will sustain the other.

With neurons 111 and 115 in an activated condition, any input at 123 of neuron 111 or input 133 of neuron 115 will be reflected by an increased output frequency at the output of each. With this arrangement, it can be appreciated that a bilateral transmission network has been created.

If, for example, the neuron 121 was now activated, the sustaining input would be created by output 143 of neuron 115. Neuron 115 would now be conditioned by two inputs 157 and 161 and would have a higher frequency output than either neuron 111 or 121. However, it will be remembered that both neurons 111 and 121 will be effected by this higher frequency output to in turn generate a higher frequency output. When this process has stabilized, it can be seen that any input change at 123, 167 or 133 will be suitably reflected in the others.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electronic neuron comprising:
   (*a*) an input circuit for summing a plurality of applied voltages;
   (*b*) an integrating pulse shaper to which said summed voltage is applied and responsive to a predetermined summation of applied voltage for generating an output;
   (*c*) said integrating pulse shaper including a charging circuit to which said summed voltage is applied wherein the magnitude of said summed voltage determines the time interval through which said summed voltage must be applied to reach said predetermined summation of voltage for generating an output;
   (*d*) an inhibit circuit connected to said integrating pulse shaper and responsive to an output therefrom to become operative to reduce the summed voltage to a predetermined low value, wherein said integrating pulse shaper terminates its output; and
   (*e*) a storage circuit included in said inhibit circuit for retaining said inhibit circuit in an operative state to a time subsequent to the termination of the output pulse from said integrating pulse shaper;
   (*f*) a memory responsive to an output from said integrating pulse shaper for generating an output voltage;
   (*g*) means for connecting the output of said memory to said input whereby the condition of memory aids in establishing the output to which it is responsive, whereby the frequency output of said integrating pulse shaper may be increased;
   (*h*) means contained in said memory unit for establishing the time period through which said output voltage will be generated;
   (*i*) wherein said last-mentioned means is responsive to the frequency of pulse output from said integrating pulse shaper for establishing said time period.

2. A bilateral transmission circuit including a first and second electronic neuron comprising:

(*a*) a first input for summing voltages;
   (*b*) a first integrating pulse shaper for generating an output in response to a predetermined summation of voltage;
   (*c*) a first inhibit circuit for terminating the output from said pulse shaper in response to the output of said first pulse shaper whereby an output pulse is formed;
   (*d*) a first memory circuit responsive to the output of said first pulse shaper for applying an output voltage to said first input of a substantial magnitude in comparison with said summed voltage;
   (*e*) means contained in said first memory circuit for establishing the time during which the output from said first memory will be available to said first input in dependence on the output frequency of said first pulse shaper;
   (*f*) whereby a voltage will be established at said first input sufficient to keep said pulse output from said first pulse shaper self-sustaining by said memory;
   (*g*) a second input for summing voltages;
   (*h*) a second integrating pulse shaper for generating an output in response to a predetermined summation of voltage;
   (*i*) a second inhibit circuit for terminating the output from said pulse shaper in response to the output of said second pulse shaper whereby an output pulse is formed;
   (*j*) a second memory circuit responsive to the output of said second pulse shaper for applying an output voltage to said second input of a substantial magnitude in comparison with said summed voltage;
   (*k*) means contained in said second memory circuit for establishing the time during which the output from said second memory will be available to said second input in dependence on the output frequency of said second pulse shaper;
   (*l*) whereby a voltage will be established at said second input sufficient to keep said pulse output from said second pulse shaper self-sustaining by said memory;
   (*m*) means for connecting the output of the first pulse shaper to the second input;
   (*n*) means for connecting the output of the second pulse shaper to said first input;
   (*o*) means for setting said first neuron to generate a self-sustaining output; and
   (*p*) means for setting said second neuron to generate a self-sustaining output, wherein the input of said first or second neuron will be reflected in the output of said second or first neuron.

References Cited in the file of this patent

UNITED STATES PATENTS 3,097,349 Putzrath et al. ---------- July 9, 1963

OTHER REFERENCES

"Two Theorems of Statistical Separability in the Perceptron," Cornell Aeronautical Laboratory, Inc., Report No. VG–1196–G–2, dated 1 September 1958. ASTIA AD No. 203854, pages 6–11 and FIGURE 1.

"An Electronic Model of a Nerve Cell," by Harmon and Wolfe, Semiconductor Products, August 1959, pages 36–40.

"Bionics Symposium," WADD Technical Report 60–600, dated 13–15 September 1960, pages 395–406 and FIG. 1.

"Electronics Learns From Biology," by Alan Corneretto, in Electronic Design dated September 14, 1960, pages 38–54 (page 40 particularly relied on).